United States Patent
Sherman et al.

(10) Patent No.: US 6,919,061 B1
(45) Date of Patent: Jul. 19, 2005

(54) IN-SITU METHOD FOR TREATING RESIDUAL SODIUM

(75) Inventors: Steven R. Sherman, Idaho Falls, ID (US); S. Paul Henslee, Idaho Falls, ID (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 450 days.

(21) Appl. No.: 10/154,391

(22) Filed: May 22, 2002

(51) Int. Cl.⁷ .................................................. C01D 7/00
(52) U.S. Cl. ....................... 423/421; 423/422

(58) Field of Search ................................. 423/421, 422

(56) References Cited

U.S. PATENT DOCUMENTS 3,969,488 A * 7/1976 Shaw ......................... 423/421

* cited by examiner

*Primary Examiner*—Stuart Hendrickson
(74) *Attorney, Agent, or Firm*—Mark P. Dvorscak; Bradley W. Smith; Paul A. Gottlieb

(57) ABSTRACT

A unique process for deactivating residual sodium in Liquid Metal Fast Breeder Reactor (LMFBR) systems which uses humidified (but not saturated) carbon dioxide at ambient temperature and pressure to convert residual sodium into solid sodium bicarbonate.

8 Claims, 9 Drawing Sheets

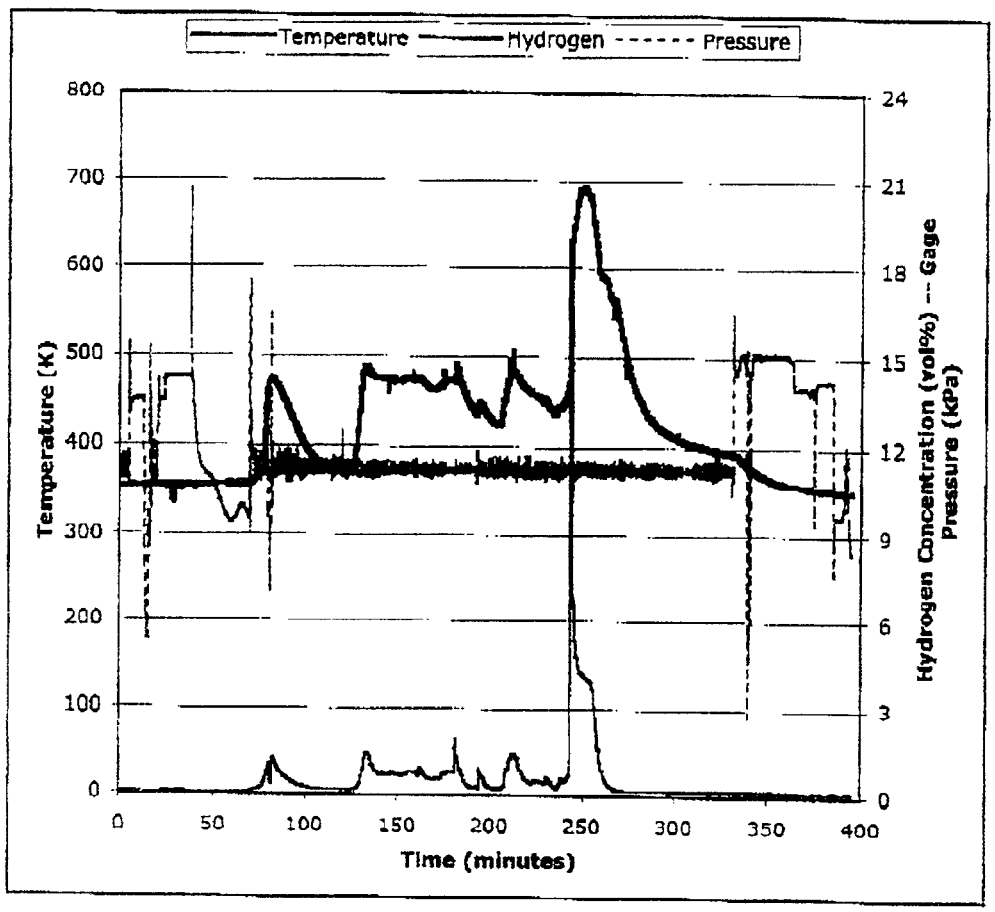
FIG. 1. Measured sample temperature, system pressure, and system hydrogen concentration for sodium sample exposed to mixture of steam and nitrogen gas.

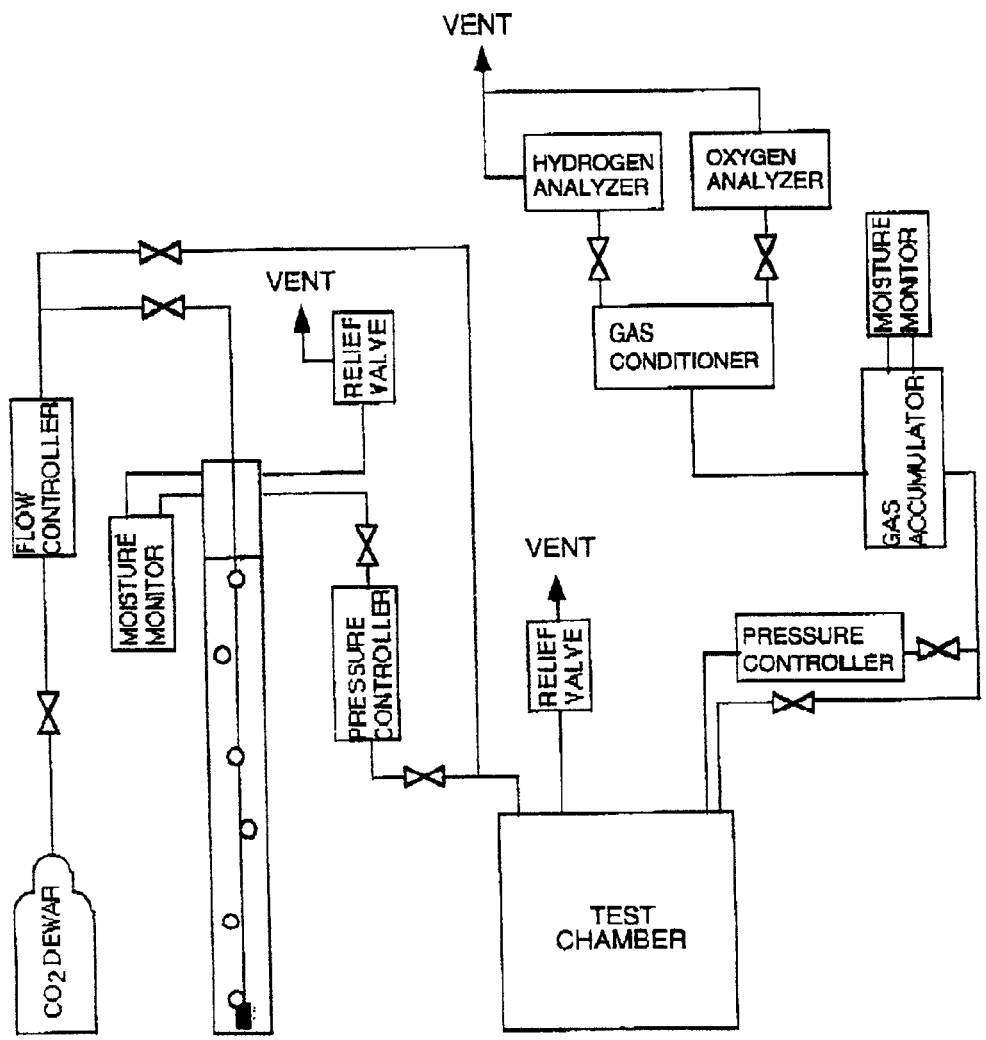
FIG. 2. Schematic of water column, test chamber, and supporting equipment.

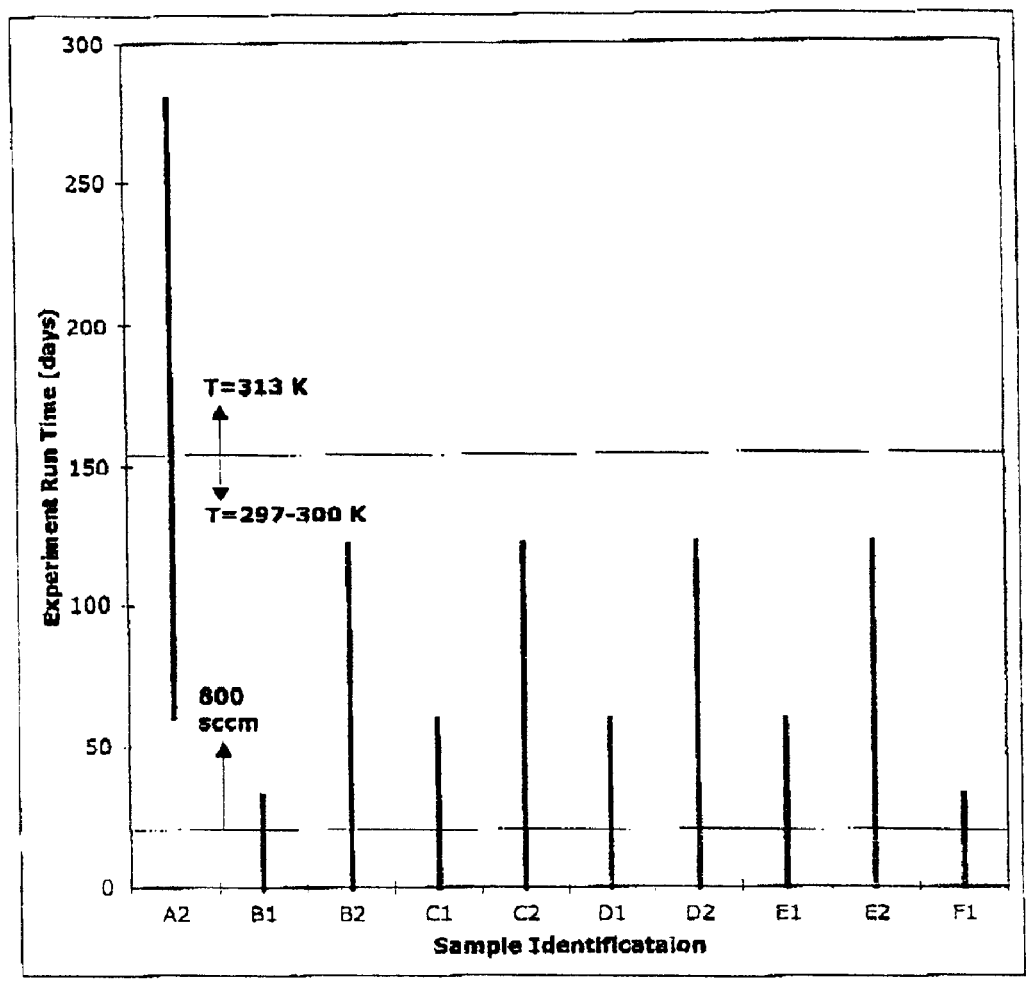
FIG. 3. Exposure time of sodium samples in test chamber.

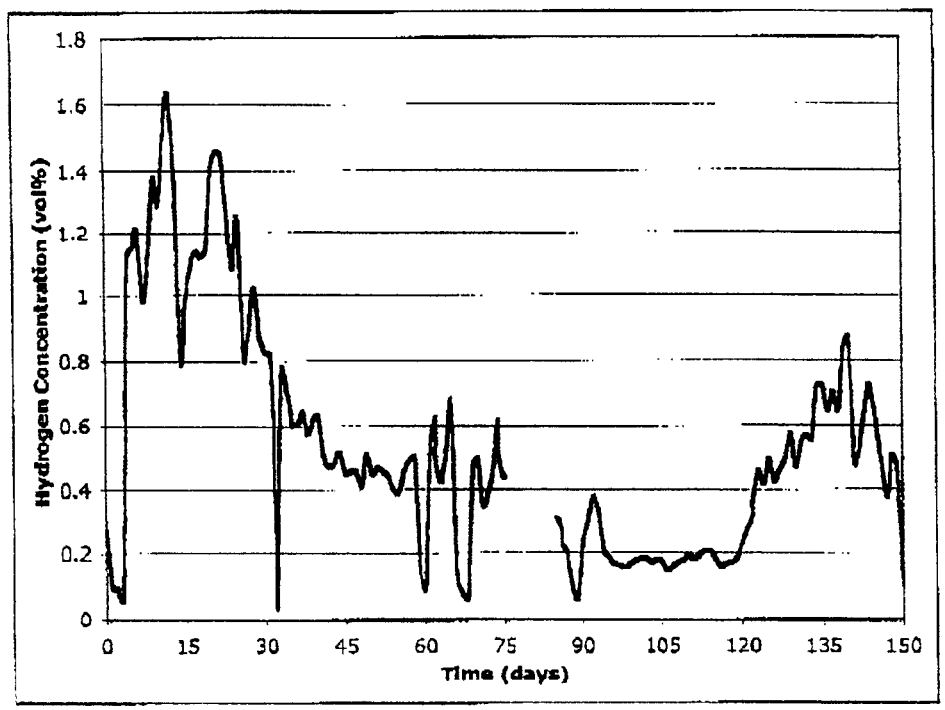
FIG. 4. Measured hydrogen concentration for time interval 0 to 150 days in the test chamber.

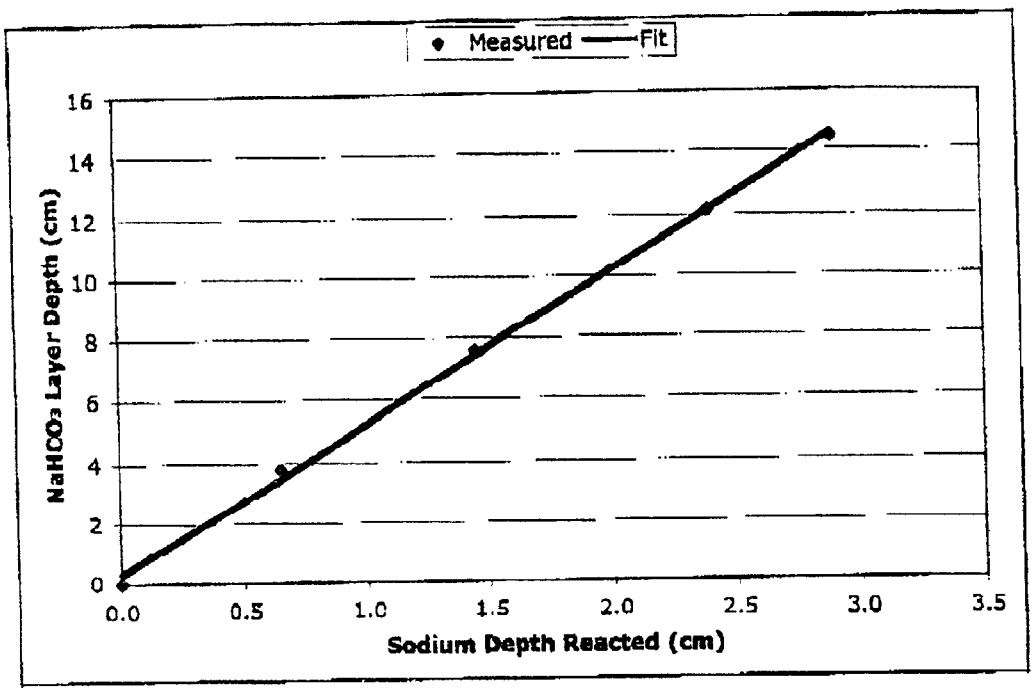
FIG. 5. NaHCO₃ layer depth versus sodium depth reacted for sample A2 at ambient conditions.

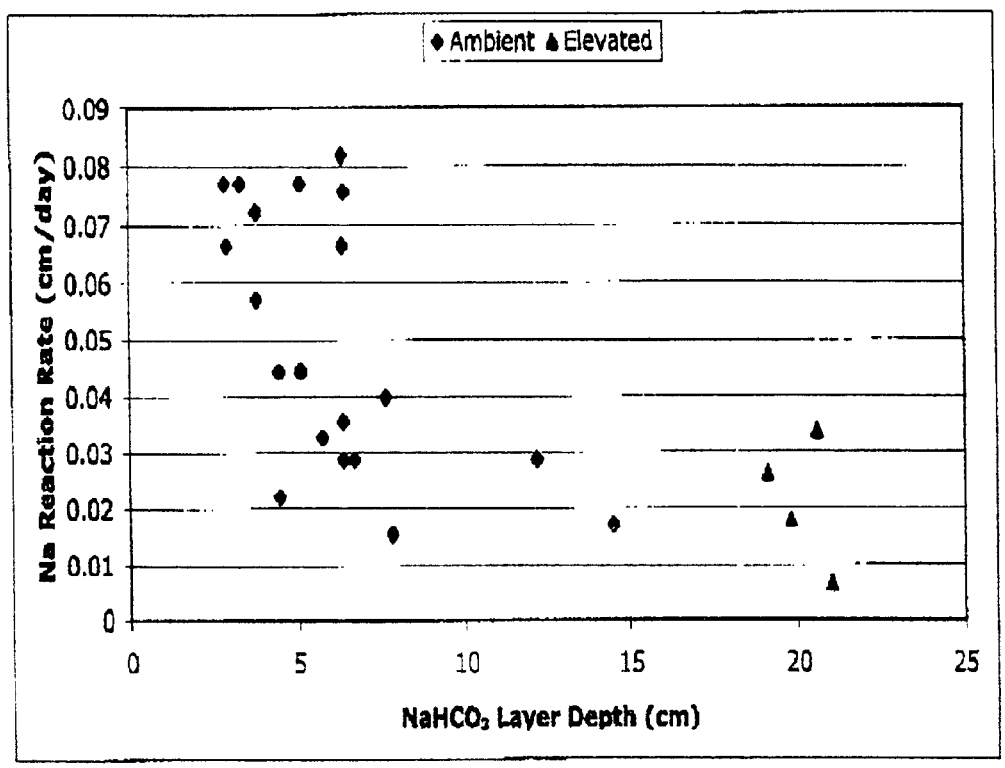
FIG. 6. Measured sodium reaction rate of sodium versus $NaHCO_3$ layer depth versus sodium depth reacted for sample A2 at ambient conditions.

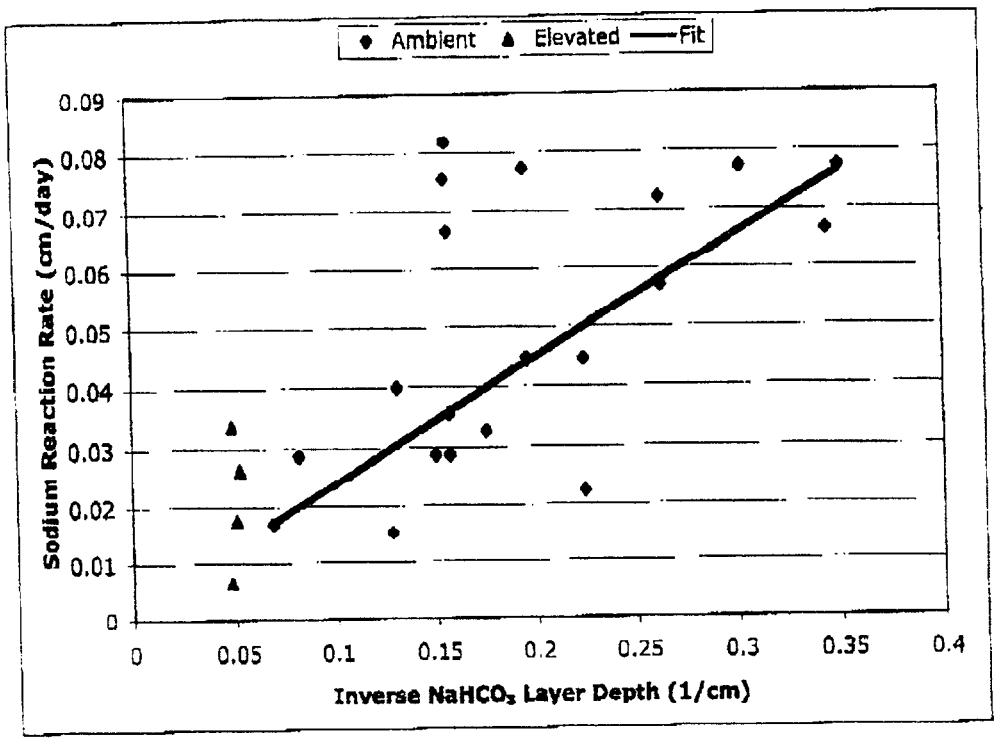
FIG. 7. Measured sodium reaction rate versus inverse sodium bicarbonate layer thickness.

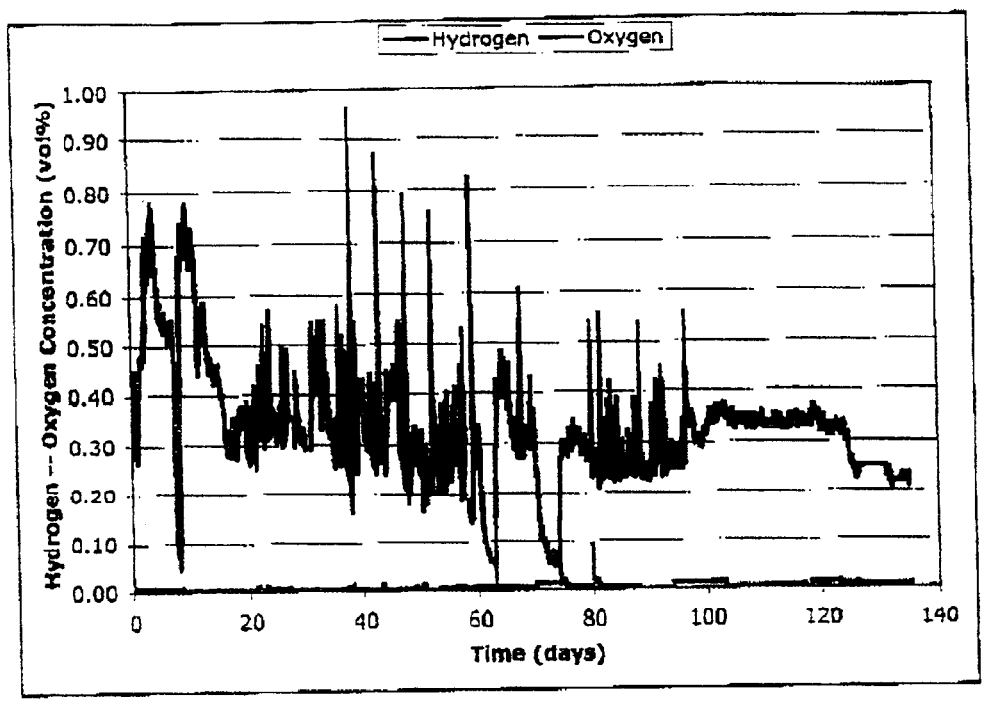
FIG. 8. Measured hydrogen and oxygen concentration during deactivation of residual sodium in the EBR-II secondary sodium system.

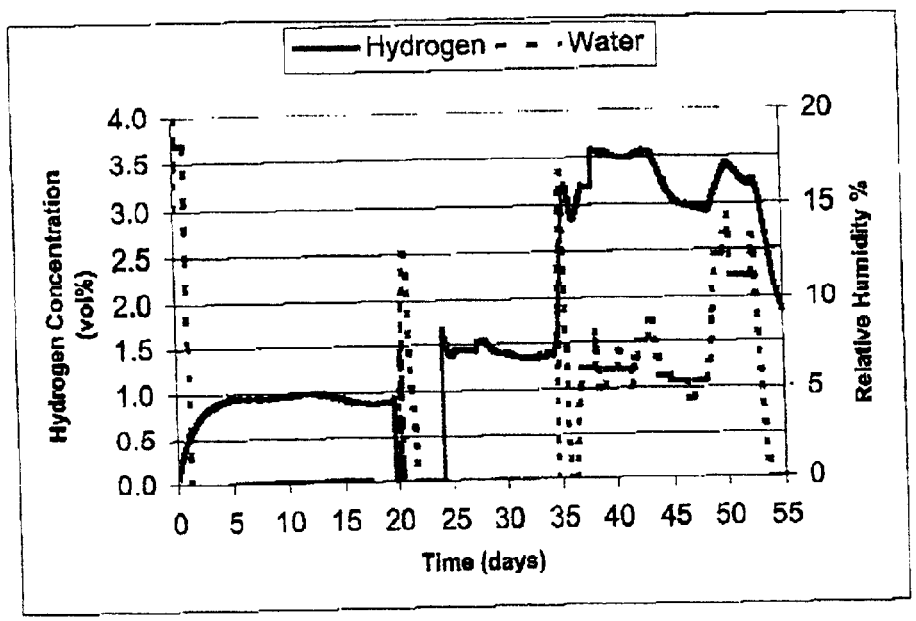
FIG. 9. Measured hydrogen concentration and relative humidity in primary sodium system vent line.

IN-SITU METHOD FOR TREATING RESIDUAL SODIUM

CONTRACTUAL ORIGIN OF THE INVENTION

The United States Government has rights in this invention pursuant to Contract No. W-31-109-ENG-38 between the U.S. Department of Energy and The University of Chicago representing Argonne National Laboratory.

BACKGROUND OF THE INVENTION

This invention relates to a technique for the deactivation of residual sodium metal in general and in Liquid Metal Fast Breeder Reactor (LMFBR) systems in particular. Sodium metal is most commonly used in LMFBR systems as a heat transfer fluid because of its good technical characteristics, including a low melting point (370.7 K), high boiling point (1153 K), a water-like viscosity when molten (0.4519 cP at 473 K), a high heat transfer coefficient (0.820 W/cm-K at 473 K), and a high thermal heat capacity (1.34 J/g-K) at 473 K). Also, it is less chemically hazardous than other metals such as sodium-potassium alloy (NaK), and so allows for easier system maintenance activities. Residual sodium is defined as the sodium metal remaining behind once the bulk sodium has been drained from any commercial application but specifically from these systems for reasons of maintenance or decommissioning work. The residual sodium may either be in the form of a thin coating on vertical surfaces or thicker pools at the bottom of vessels, elbows, horizontal runs of pipe, etc. This residual sodium must also be removed in order to make the system safe for exposure to open air and often to comply with regulations that require the removal of the hazardous components in order to begin decommissioning activities. Although the specific examples hereinafter set forth refer to LMFBR systems, the invention is far broader and includes treatment of any residual sodium in any commercial or industrial application, and is not limited to nuclear reactors.

Currently, the best-established method for removing residual sodium is chemical deactivation of the residual sodium using steam and nitrogen or water-saturated nitrogen, followed by a liquid water wash to remove the reaction products. The steam or water vapor is used to convert the residual sodium into sodium hydroxide and hydrogen, while the nitrogen is used to dilute the hydrogen and to prevent the intrusion of air into the system being treated. Once the sodium metal has been converted into sodium hydroxide, the sodium hydroxide can be safely water-flushed without the hazard of generating an explosive hydrogen atmosphere.

The technique of using steam and nitrogen is commonly used in industry to remove residual sodium. For instance, Safety-Kleen, Inc., one of the United State's largest environmental services companies, routinely uses steam and nitrogen to clean residual sodium from storage tanks and other systems, including two used sodium tanks that were located at Argonne National Laboratory-West. In addition, E. I. DuPont de Nemours, Inc., also uses this technique to clean sodium rail cars once they have been drained of bulk sodium.

Steam and nitrogen have been used to clean nuclear systems containing residual sodium. In 1968, Atomics International, a Rockwell International company, deactivated the residual sodium in the primary heat transfer system at the Hallam Nuclear Power Facility, which was located south of Lincoln, Nebr., using a steam-nitrogen mixture. Argonne National Laboratory commonly uses the technique to remove residual sodium, though not in-situ, from smaller parts that are either coated with sodium or contain residual amounts of sodium, such as valves or small containers that were used in nuclear applications.

A modification of the steam-nitrogen technique was developed by Merrick Remediation Company, Inc., another environmental services company located in the United States. The technique, designed mainly for treating residual sodium in large vessels, uses water-saturated nitrogen gas to react residual sodium.[2,3] Water-saturated nitrogen is forced by pressure differential into the vessel being treated. The vessel is maintained at a lower temperature than the incoming gas stream so that liquid water condenses from the vapor stream and reacts with the residual sodium. The sodium hydroxide created by the water-sodium reaction is removed as an aqueous solution by suction, and the hydrogen gas is vented as a mixture of nitrogen and hydrogen. Using humidified nitrogen instead of steam and nitrogen eliminates the need for a steam source at the treatment site. Also, it reduces the hazard to workers by reducing the surface temperatures of process piping.

While these methods are effective at deactivating residual sodium, there are two disadvantages inherent in either technique. The first disadvantage is in the lack of control of the reaction process. On a crude level, the deactivation reaction is controllable in that turning on the flow of steam or water-saturated nitrogen can start the reaction, and stopping the flow of steam or water-saturated nitrogen can stop the reaction. The reaction temperatures and pressures, however, can be unstable, especially if the layer thickness of sodium hydroxide solution is allowed to increase beyond approximately one centimeter on top of the residual sodium. According to an unpublished report by Atomics International, the company that performed the deactivation of residual sodium in the Hallam Reactor, a concentration gradient is established in the liquid layer between the surface of the residual sodium and the surface of the sodium hydroxide layer with the lowest concentration of sodium hydroxide (and the highest water concentration) occurring at the exposed sodium hydroxide surface. Occasionally, the movement of hydrogen bubbles or other mechanical disturbances can cause the layer to circulate, leading to the sudden exposure of residual sodium to a solution that is rich in water. This can cause sudden spurts of chemical reactivity, which can lead to sudden surges in temperature, pressure, and in hydrogen production.

We have measured direct evidence of this instability. Inside an instrumented test chamber, 0.025 kg of sodium metal was exposed to a mixture of steam and nitrogen flowing at a rate of 0.45 kg/hour and 0.70 kg/hour, respectively. The temperature of the incoming gas mixture was 356 K. The temperature of the sodium sample was measured along with the chamber pressure and the concentration of hydrogen in the off-gas. FIG. 1 shows that the temperature of the specimen varied widely between 356 K and as high as 708 K. The temperature spikes were accompanied by surges in system pressure and hydrogen concentration. Larger surges in pressure may have occurred during the test, but the pressure instrumentation and control equipment limited the recorded readings to no higher than +20.7 kPa (3 psi).

The second disadvantage is the creation of concentrated solutions of sodium hydroxide. Concentrated sodium hydroxide solutions are corrosive to equipment and hazardous to workers. Often sodium hydroxide solutions must be neutralized before disposal, which adds to the expense of the deactivation process and creates a larger volume of waste.

As an alternative to the established residual sodium deactivation techniques, we offer a unique process for deactivating residual sodium that does not suffer from temperature and pressure instabilities and does not produce waste that requires neutralization. Unlike conventional deactivation techniques that use steam-and-nitrogen or water-saturated nitrogen to convert residual sodium metal into sodium hydroxide, this process uses humidified (but not saturated) carbon dioxide at ambient temperature and pressure to convert residual sodium into solid sodium bicarbonate.

BRIEF DESCRIPTION OF THE DRAWINGS

The present invention together with the above and other objects and advantages may best be understood from the following detailed description of the embodiment of the invention illustrated in the drawings, wherein:

FIG. 1 is a graphical representation illustrating the prior art sample temperature, system pressure, and system hydrogen concentration for sodium sample exposed to nitrogen and steam;

FIG. 2 is a schematic of water column, test chamber, and supporting equipment (invention);

FIG. 3 is a graphical representation of exposure time of various sodium samples in inventive process;

FIG. 4 is a graphical representation of the concentration for time interval 0–150 days in test chamber;

FIG. 5 is a graphical representation illustrating the $NaHCO_3$ layer depth versus sodium depth reacted for sample A2 at ambient conditions;

FIG. 6 is a graphical representation of the sodium reaction rate of sodium versus $NaHCO_3$ layer depth.

FIG. 7 is a graphical representation of the sodium reaction rate versus inverse $NaHCO_3$ layer thickness;

FIG. 8 is a graphical representation of the hydrogen and oxygen concentration during deactivation of residual sodium in EBR-II secondary sodium system; and FIG. 9 is a graphical representation of the hydrogen concentration and relative humidity in primary sodium system vent line.

DETAILED DESCRIPTION OF THE INVENTION

Sodium metal reacts with carbon dioxide and water to form sodium bicarbonate and/or sodium carbonate, depending upon the temperature and the availability of water and carbon dioxide. These chemical reactions are generally stated by Eqs. (1) and (2).

$$Na + CO_2 + H_2O \rightarrow NaHCO_3 + 0.5H_2 \quad (1)$$

$$Na + Co_2 + H_2O \rightarrow Na2CO_3 + H2 \quad (2)$$

In Eq. (1), sodium metal reacts with gaseous carbon dioxide and water to form solid sodium bicarbonate and hydrogen gas. In Eq. (2), solid sodium metal reacts with gaseous carbon dioxide and water to form solid sodium carbonate and hydrogen gas.

Though solid sodium metal can react directly with water and oxygen, it does not react with carbon dioxide.4,5 Therefore, the overall reactions shown in Eqs. (1) and (2) cannot proceed as written for our process, which is performed at ambient temperature.

Depending upon the history of the residual sodium being deactivated, the residual sodium may be clean, or R may be coated with a surface layer of sodium oxides. Sodium oxides can form on exposed sodium surfaces when the residual sodium is exposed to air or oxygen. Sodium oxide formation is shown in Eqs. (3)–(5).

$$2\,Na + 0.5\,O_2 \rightarrow Na_2O \quad \Delta G_r^0 = -377\text{ kJ} \quad (3)$$

$$2\,Na + O_2 \rightarrow Na_2O_2 \quad \Delta G_r^0 = -439\text{ kJ} \quad (4)$$

$$Na + Na_2O_2 \rightarrow 2\,Na_2O \quad \Delta G_r^0 = -319\text{ kJ} \quad (5)$$

In Eq. (3), sodium metal reacts with oxygen to form sodium oxide. In Eq. (4), sodium metal reacts with oxygen to form sodium peroxide. In Eq. (5) sodium metal reacts with sodium peroxide to form sodium oxide. Unlike potassium metal, sodium metal does not form sodium superoxide ($NaO_2$). All three equations are strongly exothermic and occur spontaneously. Since sodium peroxide is an oxidizing agent, it readily reacts with sodium metal to form sodium oxide, and so the concentration of sodium peroxide in the oxide layer tends to be quite low at room temperature—in the parts per million (ppm) range. The oxidation layer that forms on the surface of the residual sodium is non-porous and tends to passivate or limit any further reaction of the underlying sodium once it has formed.

Fortunately, sodium oxide reacts with water to form sodium hydroxide, so that the oxidation layer is easily penetrated with water. Eqs. (6) and (7) show how water reacts with sodium and sodium oxide to form sodium hydroxide.

$$Na + H_2O \rightarrow NaOH + 0.5H_2 \quad \Delta G^o_r = -36.0\text{ kcal} \quad (6)$$

$$Na_2O + H_2O \rightarrow 2\,NaOH \quad \Delta G^o_r = -36.5\text{ kcal} \quad (7)$$

In Eq. (6), sodium metal reacts with water to form sodium hydroxide and hydrogen. In Eq. (7), sodium oxide reacts with water to form sodium hydroxide. Sodium peroxide ($Na_2O_2$) does not react spontaneously with water at ambient temperatures and remains inert.

Carbon dioxide reacts with sodium hydroxide to form sodium bicarbonate. This reaction is shown in Eq. (8).

$$NaOH + CO_2 \rightarrow NaHCO_3 \quad \Delta G^o_r = -126\text{ kJ} \quad (8)$$

The rate of sodium bicarbonate formation depends partly on the concentration of carbon dioxide. In the open air, where the concentration of carbon dioxide is less than 0.04 vol %, the conversion to sodium bicarbonate can occur quite slowly (i.e., hours to days). When exposed to a pure stream of humidified carbon dioxide, however, sodium hydroxide can convert quickly into sodium bicarbonate (i.e., seconds to minutes). The layer of sodium bicarbonate that forms, as supported by our laboratory results, is porous and allows for the penetration of water and carbon dioxide to the sodium metal underneath.

The formation of sodium carbonate occurs by two different mechanisms. In the first mechanism, sodium bicarbonate reactions with sodium hydroxide to form sodium carbonate and water, Eq. (9). In the second mechanism, sodium bicarbonate combines with itself to form sodium carbonate, carbon dioxide and water, Eq. (10).

$$NaHCO_3 + NaOH \rightarrow Na_2CO_3 + H_2O \quad \Delta G^o_r = -45.6\text{ kJ} \quad (9)$$

$$2\,NaHCO_3 \rightarrow Na_2CO_3 + H_2O + CO_2 \quad \Delta G^o_r = +28.9\text{ kJ} \quad (10)$$

Eq. (9) is thermodynamically favored but is not kinetically favored unless the sodium bicarbonate or the sodium hydroxide is dissolved in solution. Such a condition would be encountered if moisture is available in excess and is available to hydrate and dissolve the sodium hydroxide as it is produced. Eq. (10) does not go forward at all unless the temperature is greater than 323–333 K (50–60° C.) and even then does not reach a fast rate of reaction unless the temperature exceeds the boiling point of water. For the inventive deactivation process, it is expected that the sodium metal will be converted almost entirely into sodium bicarbonate. Any sodium hydroxide created by Eqs. (6) or (7) is quickly converted into sodium bicarbonate by Eq. (8) because of the high concentration of carbon dioxide. Since the deactivation process operates at ambient temperature, no transformation of sodium bicarbonate into sodium carbonate is expected.

Experiments were performed in order to study the effects of humidified carbon dioxide on samples of sodium metal. The goals of the experiments were to determine the stability of the deactivation process with regard to sudden temperature and pressure changes and variations in the rate of hydrogen generation, confirm the chemical composition of the sodium bicarbonate layer, observe the morphology and measure the density of the carbonate surface layer, and determine the deactivation rate of sodium as a function of sodium bicarbonate layer thickness and moisture input rates. In these experiments, samples of sodium metal were placed into a test chamber and exposed to a continuous flow of humidified carbon dioxide. The growth of the sodium bicarbonate layer was observed over time and measurements were taken on the growth rate of the layer versus the consumption rate of the sodium samples. Observations were recorded concerning the morphology of the sodium bicarbonate layer and samples were taken of the layer for chemical analysis. This section presents a summary of the experimental equipment and procedures used to obtain the measured data.

The sodium metal was obtained in 0.454 kg cans from Fischer Scientific and contained less than 0.002 wt % chlorides and 0.001 wt % iron. The 99.99% pure carbon dioxide was supplied in liquid form from AGA Specialty Gases. Distilled water was used to humidify the carbon dioxide.

The test chamber was constructed of carbon steel and measured 59.01 cm in diameter, 62.38 cm in height, and has an internal volume of 0.1709 $m^3$. It was topped with a stainless steel cover plate that had 6 entry ports. Each entry port was instrumented with four thermocouples that could be used to monitor the temperature of samples located beneath each port.

The entire system consisted of a carbon dioxide dewar, a water column, the test chamber, a gas analysis cabinet, and an assortment of valves and instruments. A schematic of the experimental equipment is shown in FIG. 2.

Humidified carbon dioxide was supplied to the test chamber by sparging carbon dioxide through a water column that was connected to the test chamber. The water column was made from a clear acrylic pipe measuring 243 cm long and 9.53 cm in diameter. The water level in the pipe was maintained at approximately 195 cm above the porous alumina filter stone through which the carbon dioxide entered the water column. A Panametrics #MMS35-321-1-100 w/M2LR probe moisture monitor was connected to the gas space of the water column and was used to measure the moisture content of the humidified carbon dioxide. The water column was very efficient as was able to humidify the carbon dioxide to 99% relative humidity.

A mass flow controller and two pressure controllers controlled the flow rate of carbon dioxide through the water column and the test chamber. Carbon dioxide was supplied from the carbon dioxide dewar at +70 kPa. The mass flow controller was used to control the mass flow rate of carbon dioxide to the water column. The pressure controller following the water column acted as a back-pressure regulator and maintained the pressure inside the water column at +35 kPa. The pressure controller following the test chamber was also used as a back-pressure regulator and maintained the pressure of gas inside the test chamber at +0.25–0.30 kPa.

Instrumentation for measuring the moisture level, oxygen concentration, and hydrogen concentration in the test chamber off-gas followed the test chamber pressure controller. Due to the flow rate requirements of the hydrogen and oxygen monitors, a ballast tank or gas accumulator was used to provide enough gas volume so that the hydrogen and oxygen monitors would not disturb the pressure controller. A moisture monitor of the same kind used for the water column was connected to the gas accumulator to provide a measure of the moisture content of the vent gas. Following the gas accumulator, a Clean Air Engineering Express SGC-4000 sample gas conditioner was used to remove moisture from the vent gas stream by cooling the gas stream and reducing the dew point of the gas to between 277.6 K and 280.4 K. The Teledyne Analytical Instruments #326RB oxygen monitor was set to the mid-range of 0 to 4 vol % and was used monitor for oxygen in-leakage into the system. The Teledyne Analytical Instruments #235 B hydrogen monitor was calibrated for 0 to 5 vol % hydrogen in carbon dioxide and was used to measure the hydrogen levels generated by the deactivation reactions.

The water column, the test chamber, and the process lines were equipped with electrical resistance heaters, so that the temperature of the water column and; the temperature of the flow chamber could be changed. The lower temperature limit of the equipment was ambient temperature and the upper temperature limit was at approximately 330 K, which was determined by the upper temperature limit on the instrumentation electronics. At all times, the temperature of the test chamber was maintained at least 5 K higher than the temperature of the humidified carbon dioxide emerging from the water column, so that condensation of moisture inside the test chamber could be avoided.

All run data was recorded operating Labview 6i software.

Pyrex graduated cylinders and flasks were used to contain the metallic sodium samples. Glass containers were used because it allowed for non-destructive measurement of the sodium height and the sodium bicarbonate layer thickness over time.

The sodium samples were prepared in an argon-purged glove box. The oxygen content of the glove box atmosphere was less than 1.5 vol %. Empty flasks and graduated cylinders were placed on a hot plate and heated above the melting point of metallic sodium, 370.7 K (97.5 (C). Then, sodium was added in small increments to the containers. The sodium was allowed to melt completely between sodium increments. The shiny metallic surface of the sodium can be seen through the sides of the containers. The white coating on the top of the sodium samples is sodium oxide.

The dimensions of the samples varied between 1.27 cm and 6.50 cm in diameter and between 1.27 cm and 22.9 cm in sodium depth. Table I shows the sample name, sample diameter, sodium depth, and container depth for each sample.

After they had cooled, the sodium samples were moved to the test chamber by loading them into an argon-purged zip-lock bags and then transporting the zip lock bag with the samples to the test chamber. The sample zip-lock bag was placed inside a glove bag covering the top of the test chamber. The test chamber's glove bag was then purged with $CO_2$ until the measured oxygen level fell below 2.0 vol %. Once this threshold had been reached, the chamber was opened and the samples were removed from the sample glove bag and placed into the chamber. As each sample was loaded into the chamber, a thermocouple was pressed into the top of the sample so that the temperature of the sample could be measured during the experiment.

TABLE I

Sodium Sample Descriptions

| Sample Name | Diameter (cm) | Sodium Height (cm) | Container Height (cm) |
|---|---|---|---|
| A2 | 4.75 | 22.9 | 37.5 |
| B1 | 6.51 | 2.54 | 2.54 |
| B2 | 1.95 | 10.2 | 10.2 |
| C1 | 6.51 | 3.81 | 3.81 |
| C2 | 2.54 | 10.2 | 10.2 |
| D1 | 6.51 | 5.08 | 5.08 |
| D2 | 3.49 | 10.2 | 10.2 |
| E1 | 6.51 | 7.62 | 7.62 |
| E2 | 6.51 | 10.2 | 10.2 |
| F1 | 6.51 | 1.27 | 1.27 |

Samples placed into the test chamber were exposed to humid carbon dioxide for periods of time that varied between 33 days and 219 days. FIG. 3 shows the exposure time used for each sample. In the figure, the horizontal line at Day 16 shows where the flow rate of humidified carbon dioxide was increased from 0.4 standard liters per minute to 0.8 standard liters per minute. The second horizontal line above that shows where the water column temperature was increased from ambient temperature (297–300 K) to 313 K. When the water column was at ambient temperature, the temperature of the test chamber was maintained between 307 K and 311 K to prevent moisture condensation. When the water column temperature was increased to 313 K, the temperature of the test chamber was increased to between 327 K and 333 K for the same reason.

The samples were periodically removed from the chamber and examined for changes in sodium depth, sodium bicarbonate layer depth, and for cracks in the sample containers. Whenever samples were examined, the flow of humidified carbon dioxide was stopped and replaced with dry carbon dioxide. When the oxygen concentration inside the test chamber glove bag fell below 2.0 vol %, samples were removed from the test chamber and withdrawn into the glove bag. After taking measurements and photographs of a particular sample, the sample was either removed from the experiment or placed back inside the test chamber for more exposure time, depending upon the state of the sample and the goals of the experimental work. Prior to the water column temperature increase, samples were removed from the test chamber either when the sodium in a particular sample had been completely consumed or when the glass sample container had broken due to, expansion of the sodium bicarbonate layer. After the water column temperature was increased, only Sample A2 was left inside the test chamber for further testing.

TABLE II

Measured Sodium Reaction Depth and Bicarbonate Layer Depth

| Sample | Time (days) | Na Depth Reacted (cm) | $NaHCO_3$ Layer Depth (cm) |
|---|---|---|---|
| A2 | 0 | 0.00 | 0.00 |
|  | 9 | 0.65 | 3.80 |
|  | 29 | 1.45 | 7.60 |
|  | 62 | 2.40 | 12.2 |
|  | 91 | 2.90 | 14.5 |
| A2 | 125 | 3.80 | 19.1 |
| (at 313 K) | 153 | 4.75 | 20.6 |
|  | 181 | 5.25 | 19.8 |
|  | 219 | 5.50 | 21.0 |
| B1 | 0 | 0.00 | 0.00 |
|  | 33 | 2.50 | 6.40 |
| B2 | 0 | 0.00 | 0.00 |
|  | 33 | 2.20 | 2.90 |
|  | 61 | 3.80 | 3.80 |
|  | 90 | 5.10 | 5.1 |
|  | 123 | -- fractured -- | |
| C1 | 0 | 0.00 | 0.00 |
|  | 33 | 2.55 | 5.10 |
|  | 61 | -- fractured -- | |
| C2 | 0 | 0.00 | 0.00 |
|  | 33 | 2.55 | 3.30 |
|  | 61 | 3.80 | 4.45 |
|  | 90 | 4.45 | 4.45 |
|  | 123 | 5.40 | 6.35 |
| D1 | 0 | 0.00 | 0.00 |
|  | 33 | 2.70 | 6.35 |
|  | 61 | -- fractured -- | |
| D2 | 0 | 0.00 | 0.00 |
|  | 33 | 2.55 | 2.85 |
|  | 61 | 3.80 | 5.10 |
|  | 90 | 4.75 | 5.70 |
|  | 123 | 5.70 | 6.65 |
| E1 | 0 | 0.00 | 0.00 |
|  | 33 | 2.55 | 5.10 |
|  | 61 | -- fractured -- | |
| E2 | 0 | 0.00 | 0.00 |
|  | 33 | 2.20 | 6.35 |
|  | 61 | 3.20 | 6.35 |
|  | 90 | 3.65 | 7.80 |
|  | 123 | -- fractured -- | |
| F1 | 0 | 0.00 | 0.00 |
|  | 33 | 1.27 | N/A |

During the test, no unstable temperature or pressure behavior was observed in the test chamber. All measured sample temperatures were equal to the test chamber temperature, and no excess pressure changes were detected. FIG. 4 shows the measured hydrogen concentration over the time interval 0 to 150 days. At no time did the hydrogen levels exceed the lower flammable limit of hydrogen in air, 4 vol %. The short dips in hydrogen concentration below 0.2 vol % correspond to times when samples were either examined or removed. The reaction process appears to be stable and benign.

As the humidified carbon dioxide reacted with the sodium samples, a layer of white material accumulated on the top surface of the samples. The material that formed was solid, but readily crumbled into a powder when mechanically disturbed.

Five samples of this layer were taken from various sodium samples and were analyzed by X-ray diffraction and standard acid-base titration with 0.1 M hydrochloric acid. The X-ray diffraction tests showed that, qualitatively, the samples were composed entirely of sodium bicarbonate. By titration, the samples were composed of 91+/−3 wt % sodium bicarbonate and 4+/−2 wt % sodium carbonate. The balance of the mass was not identified but is presumably water, since sodium bicarbonate and especially sodium carbonate are hydrophilic.

The observations recorded for the depth of sodium reacted and the layer depth are shown in Table II. According to laboratory observations and the information recorded in the table, the sodium bicarbonate layer is less dense than metallic sodium. The sodium undergoes an increase in volume when it is converted into sodium bicarbonate. It is this volume increase which caused sample containers B2, C1, D1, E1 and E2 to fracture during the tests. The expansion of the layer caused the sample container to split longitudinally, which resulted in the exposure of fresh sodium.

The degree of expansion can be determined by examining the ambient temperature data available for sample A2. Sample A2 is unique because the sample container was only partially filled with sodium, leaving a void space 14.6 cm high above the sodium to contain the sodium bicarbonate layer. All the other samples were filled to the top of their containers, so that when the sodium bicarbonate layer grew beyond the confines of the container walls, the excess material tended to fall out of the container and fall to the bottom of the test chamber. FIG. 5 shows a plot of the depth of sodium reacted to the depth of the sodium bicarbonate layer for Sample A2 under ambient conditions.

The equation of the line, $y=(4.95+/-0.11)x+(0.29+/-0.20)$, has a correlation coefficient of $r=0.999$. The intercept for the equation is almost zero, which is consistent with a zero layer thickness when no sodium has reacted. The equation shows that for every centimeter of sodium that reacted in Sample A2, approximately 5 cm of layer were created.

The expansion in volume arises from two causes. The first cause is the change in molar volume that occurs when sodium is converted into sodium bicarbonate. Sodium metal has a molar volume of 23.5 cm$^3$ per mole, while sodium bicarbonate has a molar volume of 38.2 cm$^3$ per mole. This equates to a 1.6 times expansion when the sodium is converted into sodium bicarbonate. The second cause is the volume expansion that occurs due to the creation of void space in the sodium bicarbonate. Assuming that the total expansion factor is approximately 5, then the void fraction of the sodium bicarbonate layer is approximately 0.7. The molar volume change plus the creation of void space creates the approximately five-fold expansion in the volume.

FIG. 6 plots the data presented in Table II. The sodium reaction rate was calculated discretely by dividing the difference between observed sodium reaction depths by the difference between observation times. It is apparent that the rate of reaction decreases with increasing layer thickness. In FIG. 6, the diamonds designate the measurements made at ambient temperature, and the triangles designate the measurements made for Sample A2 at elevated temperature.

The scatter in the data arises from two causes. One, it is only a crude assumption that the reaction rate of sodium is constant between observation times. Second, the sodium bicarbonate layer thickness tended to fluctuate when the layer had grown beyond the bounds of the sample container due to material losses.

The effect of the sodium bicarbonate layer thickness on the rate of sodium reaction becomes clearer when the sodium reaction rate is plotted against the inverse sodium bicarbonate layer thickness, as shown in FIG. 13. In the figure, the diamonds show the measurements made at ambient temperature, the triangles show the measurements made at elevated temperature, and the fitted line shows a linear fit of the data, excluding the elevated temperature data and the 4 data points showing uncharacteristically high reaction rates for an inverse layer thickness between 0.15 and 0.20 cm$^{-1}$.

FIG. 7 shows that the sodium reaction rate is linearly proportional to the inverse layer thickness. The equation of the line is $y=(0.210+/-0.039)x+(0.002+/-0.009)$ and has a correlation coefficient of $r=0.797$. The fit of the line shows that the sodium reaction rate is inversely correlated with the sodium bicarbonate layer thickness. Also, the intercept of the line is statistically indistinguishable from zero, which is consistent with the boundary condition that the sodium reaction rate tends towards zero as the layer thickness tends towards infinity.

The higher temperature measurements plotted in FIG. 7 show that increasing the temperature (and the moisture content) of the carbon dioxide increases the reaction rate of sodium for a given layer thickness. The left-most ambient temperature point in FIG. 7 corresponds to Sample A2 after 91 days of exposure at ambient conditions. Once the temperature of the humidified carbon dioxide was increased, the sodium reaction rate more than doubled. The increase in reaction rate was not sustained, however. It is believed that the elevated temperature of the test chamber, 327–333 K, was causing the slow transformation of the sodium bicarbonate layer into sodium carbonate (see Eq. 10). Sodium carbonate absorbs water readily to form sodium carbonate monohydrate, and so may have reduced the rate of moisture diffusing to the sodium surface. No chemical analysis was performed on the layer for Sample A2 at the close of the experiment, and so no confirmation of this hypothesis could be made.

The technique of deactivating residual sodium with humidified carbon dioxide was applied to treating residual sodium in the primary and secondary sodium systems of the Experimental Breeder Reactor II (EBR-II), located at Argonne National Laboratory—West in southeastern Idaho.

EBR-II is a sodium-cooled fast breeder reactor that operated from 1964 until 1994. The reactor used metallic alloy fuel and a pool-type design. For this design, the reactor was placed into a large tank and submerged in a pool of sodium metal. Sodium metal from the pool was pumped through the core of the reactor and out again to the pool to remove the heat of reaction. The sodium pool and its accompanying pumps, cold traps, etc., is known as the primary sodium system and the tank that contains the primary sodium system is known as the primary tank. An intermediate heat exchanger was used to transmit the thermal energy from the sodium pool to a secondary loop containing liquid sodium. The secondary loop along with its supporting equipment is known as the secondary sodium system. Thermal energy from the secondary loop was used to produce steam, which drove the steam turbine to produce electrical power. The reactor was capable of producing 62.5 MW-thermal and 19.5 MW-electric. When operating, the reactor's primary tank contained approximately 340 m$^3$ of sodium metal, and the secondary cooling system contained approximately 130 m$^3$ of sodium metal.

After the reactor was shut down in 1994 as a result of congressional mandate, the United States Department of Energy ordered that the bulk sodium be drained from the primary and secondary sodium systems and that the reactor and all reactor support systems be placed into an industrially and radiologically safe condition in preparation for eventual decommissioning activities.

As part of the efforts to prepare EBR-II for eventual decommissioning, the residual sodium remaining in the primary and secondary sodium systems after the bulk sodium was drained was treated using humidified carbon dioxide. This section describes the measurements and results obtained during these sodium deactivation operations.

After the bulk sodium was drained from the secondary sodium system, approximately 400 liters of residual sodium remained in the complex network of pipes, valves, and heat exchangers that comprised the system. Humidified carbon dioxide was chosen as the sodium deactivation agent for this system because the process is inexpensive to operate, has been demonstrated in the laboratory, and produces no large fluctuations in temperature, pressure, and hydrogen production. Also, the secondary sodium system was a good system to choose for testing the large-scale application of the technique because all parts of the system were accessible for inspection by workers.

In order to treat the residual sodium using humidified carbon dioxide, the secondary sodium system was modified. A gas manifold was installed that would allow for the distribution of gas to all parts of the system simply by manipulating valves. A vent line was installed at a central location, so that exhaust gases could be purged. In addition, a hydrogen monitor, an oxygen monitor, and a gas conditioning unit of the same make as were used for the laboratory experiments were installed on the vent line. The vent line could be closed with a shut-off valve, but was generally opened to the atmosphere during the sodium deactivation work.

After the hardware modifications were completed, the system was flushed with dry carbon dioxide at a rate of 134 standard liters per minute for a period of 4 days. This dry carbon dioxide flush removed at least 50% of the argon blanket according to calculations and the calibration offset in the hydrogen monitor.

Once the dry carbon dioxide purge was stopped the deactivation process was begun. The system was purged with ambient temperature (289–297 K) humidified carbon dioxide having a relative humidity between 65% and 75%. The ambient pressure at the elevation of EBR-II is 84 kPa.

No temperature spikes were measured during the sodium deactivation, nor were any noises heard that would suggest an out-of-control reaction of water with hydrogen. The process appeared to operate smoothly and without uncontrollable reaction behavior.

FIG. 8 shows the measured hydrogen and oxygen concentration during the deactivation of residual sodium in the EBR-II secondary sodium system. The dips in the hydrogen concentration below 0.10 vol % correspond to periods when the system was flushed with dry carbon dioxide for reasons of system maintenance. The large narrow spikes in hydrogen concentration that reach above 01.70 vol % correspond to valve behavior by the deactivation reaction itself. During the deactivation period, the concentration of oxygen in the system was minimal and remained below 0.12 vol %.

The deactivation process was stopped after Day 135 so that an assessment could be performed on the effects of the process on the residual sodium within the secondary sodium system.

According to a mass balance based on an integration of the measured hydrogen concentration over time, approximately 140 kg+/−15 kg out of the originally estimated 400 kg of residual sodium was converted into sodium bicarbonate. However, 230 liters of water were evaporated from the water column, or enough water to react 294 kg of residual sodium if all of the water going into the system reacted with sodium metal. After the first month of deactivation, water vapor began to appear in the vent line, as indicated by the collection of condensed moisture from the gas conditioning unit. the loss of water vapor to the vent line provides a likely explanation for the discrepancy between the amount of hydrogen produced and the amount of water evaporated.

After cessation of the sodium deactivation at Day 135, the secondary sodium system was penetrated and visually inspected at two locations known to have dep pools of residual sodium (beyond 10 cm in depth). At each location, the sodium bicarbonate layer measured 12–13 cm deep. The height of the layer suggests that sodium had been reacted to a depth of approximately 3 cm. The layer that formed was solid, but crumbled readily when mechanically disturbed. A sample of the material was taken from one of these locations and analyzed by titration with 0.1 M hydrochloric acid. The composition of the sample was determined to be 100% sodium bicarbonate, a result consistent with the previous laboratory results.

Overall, the deactivation technique worked well for sections of the system that have enough void space to accommodate the creation and expansion of a sodium bicarbonate layer. In places that did not, plugging tended to occur. Two plugs occurred from the accumulation of sodium bicarbonate in pipes having a nominal diameter of 5.08 cm. When the plugs were discovered, they were by-passed either by opening or closing valves to create an alternate pathway, or by physically creating a by-pass of the blockage.

After the bulk sodium had been drained from the primary sodium system, approximately 1100 liters of residual sodium remained in the primary tank. Approximately 75–80% of this sodium is believed to be directly accessible by any gas-based deactivation method (e.g., steam-nitrogen, water-saturated nitrogen, humidified carbon dioxide), with the remainder of the sodium occupying deep crevices or instrumentation lines that would only be accessible by filling the primary tank with water.

Humidified carbon dioxide was chosen as the method to deactivate the accessible residual sodium because the deactivation process can be safely controlled and because of the good results obtained from the treatment of the secondary sodium system. In addition, once all of the accessible sodium has been converted into sodium bicarbonate, the sodium bicarbonate will dissolve when the remaining residual sodium in the primary sodium system is treated with liquid water. Though treatment of the remaining sodium with liquid water will create a sodium hydroxide solution, the presence of the sodium bicarbonate from the humidified carbon dioxide deactivation process will buffer any sodium hydroxide created and will make the final waste product less hazardous to handle.

The primary sodium system was prepared for sodium deactivation by installing a vent line and appropriate process instrumentation. A hydrogen monitor, oxygen monitor, gas conditioner, and moisture monitor of the same type as used in the laboratory experiments were installed so that the composition of the off-as could be measured. In addition, a Fluid Components International Model GF-92 mass flow meter was installed on the vent line so that the incoming and outgoing gas flow rates could be compared. In order to maintain a positive pressure of 45–70 Pa in the primary tank, a Jordan Valve Mk 518 2-inch back-pressure regulator was installed on the vent line.

After the additional instrumentation was installed, the primary sodium system was purged with dry carbon dioxide at a rate of 134 standard liters per minute for a period of 11 days. Calculations showed that if the primary tank were well mixed, then at least 7 days were needed to remove at least 95% of the argon cover gas. Since the purge was conducted for 11 days, it was presumed that greater than 99% of the original argon cover gas was removed by the dry carbon dioxide purge.

The primary tank was also heated to 320 K as an additional safety step in order to avoid moisture condensation during the sodium deactivation process. Heating the primary tank to 320 K also allowed the water column to be heated in order to boost sodium deactivation rates.

Sodium deactivation was performed over a period of 55 days and was conducted in two stages. The first stage, covering the first 34 days of deactivation, involved operating the water column at ambient temperature. During the second stage, the water column was operated at elevated temperatures. The flow rate of humidified carbon dioxide was maintained at 125 standard liters per minute during both stages. At ambient conditions, the humidified carbon dioxide had a relative humidity between 65% and 75%, and a temperature between 291–295 K. At elevated temperatures, the water column provided saturated carbon dioxide at various selected temperatures between 300 and 316K FIG. 9 shows the measured hydrogen and relative humidity in the vent gas from the primary sodium system during sodium deactivation.

The interruption in the signal at Day 20 occurred when the deactivation process was temporarily suspended for non-process related reasons. Once the process was resumed at Day 24, the measured hydrogen concentration shows an increase from 1.0 vol % to 1.5 vol %. This increase is believed to be the result of calibration problems with the instrument, rather than an actual change in the reactor, since the process operating conditions had not changed.

The next large increase occurred at Day 34 when the heaters for the water column were activated. The temperature of the water column was initially set to 316 K, and then subsequently reduced over the next two days to 300 K. The elevated humidity of the vent gas beyond Day 34 indicates that not all of the water going into the primary sodium system was being consumed.

The measured oxygen concentration is not shown in FIG. 9 because it remained below 0.10 vol % throughout the sodium deactivation process.

The deactivation process was stopped after Day 55 so that an assessment could be performed on the effects of the process on the residual sodium within the primary sodium system.

After stopping the deactivation process, a video camera was inserted into the primary tank in order to examine the effects of the deactivation process on the residual sodium. In all visible locations a layer of white material could be seen, where previously only the shiny metallic surface of the residual sodium could be seen. Though no samples were obtained from this layer, it is presumed that the layer was composed of sodium bicarbonate.

The method of deactivating residual sodium with humidified (but not saturated) carbon dioxide has proven to be safe and effective in both the laboratory and in large scale application. Unlike the established processes, this method can be performed at ambient temperature and pressure.

When humidified carbon dioxide reacts with residual sodium at ambient temperature, it converts it into sodium bicarbonate. The rate of reaction is proportional to the moisture concentration and is inversely proportional to the thickness of the sodium bicarbonate layer on top of the residual sodium. While the rate of reaction is slower than can be achieved by using steam and nitrogen or water-saturated nitrogen, the stability of the reaction process and the low concentrations of hydrogen produced allow the technique to be applied without constant supervision by workers.

Since residual sodium undergoes a 5-times expansion in volume when it is converted into sodium bicarbonate, the method is more ideally suited to treating vessels and pipes that have sufficient void space to accommodate the expansion of the sodium bicarbonate layer. To avoid the plugging of gas pathways, bulk sodium should be drained as much as possible from pipes and constrictions having narrow diameters. If this is not possible, then the constriction should be by-passed and the sodium within it deactivated by other means.

Also, the impedance of the sodium bicarbonate layer to the diffusion of moisture restricts the application of this technique to sodium depths no deeper than 3–6 cm. Deeper pools of sodium can be treated, but the treatment time becomes exceedingly long unless the build-up of sodium bicarbonate can be at least partially removed or displaced.

Since sodium bicarbonate is water-soluble and the sodium bicarbonate layer is porous, application of this method does not prevent the subsequent application of other sodium deactivation techniques. Steam and nitrogen or water-saturated nitrogen can still be used on residual sodium coated with a sodium bicarbonate layer, with the added effect that any sodium hydroxide solution generated by these two methods would be buffered by the sodium bicarbonate already present.

While there has been disclosed what is considered to be the preferred embodiment of the present invention as it relates to nuclear reactors, it is understood that various changes in the details may be made without departing from the spirit, or sacrificing any of the advantages of the present invention, which in general relates to any residual sodium wherever situated.

What is claimed is:

1. A method for removing substantially all of the Na in a closed system containing residual sodium, comprising purging the closed system with substantially dry $CO_2$, Introducing humid $CO_2$ having a relative humidity in the range of from about 10% to about 100% and at a temperature in the range of from about 55° F. to about 135° F. for a time sufficient to permit substantially all of the sodium present to react with the $CO_2$ and water to form $Na2CO_3$ and/or $NaHCO_3$ while evolving hydrogen gas, and removing the hydrogen gas from the closed system.

2. The method of claim 1, wherein the humidity is in the range of from about 60% to about 90%.

3. The method of claim 1, wherein the temperature is In the range of from about 70° F. to about 120° F.

4. The method of claim 1, wherein the humidity is in the rave of from about 60% to 90% and the temperature is in the range of from about 70° F. to about 120°.

5. The method of claim 1, wherein substantially all of the carbonate formed in $NaHCO_3$.

6. The method of claim 4, wherein substantially all of the carbonate formed is $NaHCO_3$.

7. The method of claim 6, wherein the $NaHCO_3$ formed has a void fraction of about 0.7 of crystalline $NaHCO_3$.

8. The method of claim 1, wherein the sodium removal is at substantially atmospheric pressure.

* * * * *